United States Patent
Ding

(10) Patent No.: US 11,623,872 B2
(45) Date of Patent: Apr. 11, 2023

(54) DEVICE AND METHOD FOR SYNTHESIS OF GALLIUM-CONTAINING GARNET-STRUCTURED SCINTILLATOR POLY CRYSTALLINE MATERIAL

(71) Applicant: CHINA ELECTRONICS TECHNOLOGY GROUP CORPORATION NO. 26 RESEARCH INSTITUTE, Chongqing (CN)

(72) Inventor: Yuchong Ding, Chongqing (CN)

(73) Assignee: CHINA ELECTRONICS TECHNOLOGY GROUP CORPORATION NO. 26 RESEARCH INSTITUTE, Chongqing (CN)

( * ) Notice: Subject to any disclaimer, the term of this patent is extended or adjusted under 35 U.S.C. 154(b) by 0 days.

(21) Appl. No.: 17/613,957

(22) PCT Filed: Mar. 23, 2020

(86) PCT No.: PCT/CN2020/080619
§ 371 (c)(1),
(2) Date: Nov. 24, 2021

(87) PCT Pub. No.: WO2020/248643
PCT Pub. Date: Dec. 17, 2020

(65) Prior Publication Data
US 2022/0251445 A1    Aug. 11, 2022

(30) Foreign Application Priority Data

Jun. 13, 2019    (CN) .......................... 201910510808.7

(51) Int. Cl.
*C01G 15/00*    (2006.01)
*H05B 7/20*    (2006.01)
(Continued)

(52) U.S. Cl.
CPC ............ *C01G 15/006* (2013.01); *C09K 11/08* (2013.01); *C09K 11/62* (2013.01);
(Continued)

(58) Field of Classification Search
CPC ........ H05B 7/20; C09K 11/621; C09K 11/64; C09K 11/641; C09K 11/7706;
(Continued)

(56) References Cited

U.S. PATENT DOCUMENTS 3,381,079 A    4/1968    Steel
5,268,925 A    12/1993   Degussa

FOREIGN PATENT DOCUMENTS

CN    1122371 A    5/1996
CN    1924115 A    3/2007
(Continued)

OTHER PUBLICATIONS

International Search Report for corresponding application PCT/CN2020/080619 filed Mar. 23, 2020; dated Jul. 3, 2020.
(Continued)

*Primary Examiner* — Matthew E. Hoban
(74) *Attorney, Agent, or Firm* — Gang Yu

(57) ABSTRACT

Provided are a device and a method for synthesis of a gallium-containing garnet-structured scintillator polycrystalline material. The synthesis device includes a polycrystalline material synthesis chamber (7) made of a thermal insulation material (1); a crucible (3) arranged at the center of the bottom of the polycrystalline material synthesis chamber; an induction coil (2) annularly arranged outside the polycrystalline material synthesis chamber at a position with a height corresponding to that of the crucible; an arc heating device (4) arranged on a central axis of the induction coil in the polycrystalline material synthesis chamber, so as to heat and melt raw materials at the center of the crucible
(Continued)

by means of the high temperature generated by arc discharge; the induction coil is connected to a RF induction power supply.

9 Claims, 1 Drawing Sheet

(51) Int. Cl.
 *C09K 11/77* (2006.01)
 *C09K 11/08* (2006.01)
 *C09K 11/62* (2006.01)
(52) U.S. Cl.
 CPC ...... *C09K 11/7774* (2013.01); *C01P 2002/30* (2013.01); *C01P 2002/52* (2013.01); *C01P 2006/80* (2013.01); *H05B 7/20* (2013.01)
(58) Field of Classification Search
 CPC ............ C09K 11/7701; C09K 11/7721; C09K 11/7716; C09K 11/7729; C09K 11/7734; C09K 11/7744; C09K 11/7749; C09K 11/7758; C09K 11/7764; C09K 11/7774; C09K 11/7792
 See application file for complete search history.

(56) References Cited

FOREIGN PATENT DOCUMENTS

| | | |
|---|---|---|
| CN | 101235557 A | 8/2008 |
| CN | 101263238 A | 9/2008 |
| CN | 101545140 A | 9/2009 |
| CN | 101724902 A | 6/2010 |
| CN | 101913636 A | 12/2010 |
| CN | 101955314 A | 1/2011 |
| CN | 202002483 U | 10/2011 |
| CN | 102503357 A | 6/2012 |
| CN | 103370452 A | 10/2013 |
| CN | 104775155 A | 7/2015 |
| CN | 106381458 A | 2/2017 |
| CN | 106766896 A | 5/2017 |
| CN | 106978629 A | 7/2017 |
| CN | 109280973 A | 1/2019 |
| CN | 109868508 A | 6/2019 |
| CN | 110092411 A | 8/2019 |
| JP | H0388800 A | 4/1991 |
| WO | WO2006001316 * | 6/2005 |

OTHER PUBLICATIONS

First search report of corresponding CN application No. 201910510808.7.

* cited by examiner

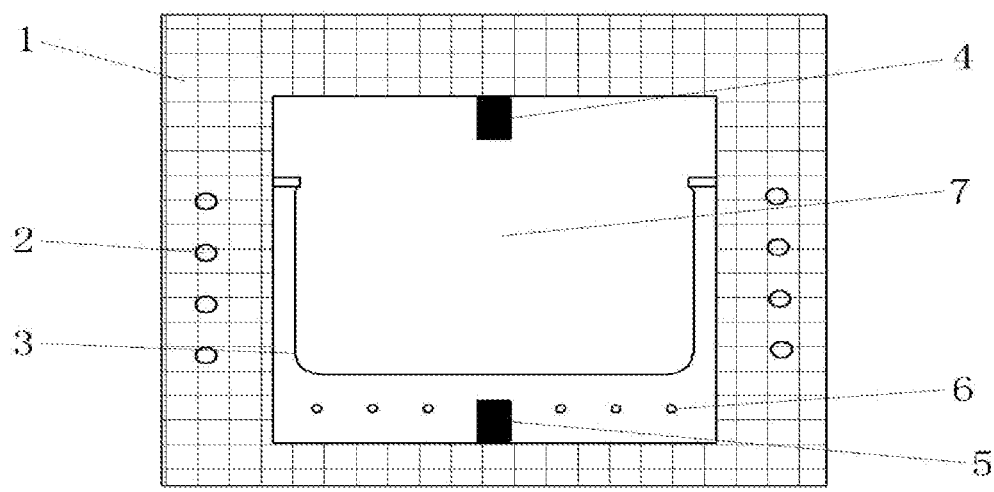

DEVICE AND METHOD FOR SYNTHESIS OF GALLIUM-CONTAINING GARNET-STRUCTURED SCINTILLATOR POLY CRYSTALLINE MATERIAL

TECHNICAL FIELD

The disclosure relates to the improvement of crystal growth technology, in particular to a device and method for synthesis of a gallium-containing garnet-structured scintillator polycrystalline material, belonging to the field of crystal growth technology.

BACKGROUND

Gallium-containing garnet-structured scintillator (($Gd_{1-x-i-j}A_xB_iC_j)_3(Ga_yAl_{1-y})_5O_{12}$, A=Y, Lu; B=Ce, Pr; C=Mg, Ca, Sr, Ba, Zn) is an inorganic scintillator material with excellent comprehensive properties, It has the advantages of high density, fast decay time, high light yield and stable physicochemical properties, and has important application prospects in PET, TOF-PET and X-ray CT. Gallium-containing garnet scintillator is usually synthetized by the Czochralski method, and its raw materials are $Gd_2O_3$, $Ga_2O_3$, $Al_2O_3$, $CeO_2$ powders with purity above 99.99% and other oxides or carbonates of the doping elements in the chemical formula (($Gd_{1-x-i-j}A_xB_iC_j)_3(Ga_yAl_{1-y})_5O_{12}$, A=Y, Lu; B=Ce, Pr; C=Mg, Ca, Sr, Ba, Zn) (for example, when the C element in the chemical formula is Ca, the raw material can be CaO or $CaCO_3$). Before growing the single crystal, these raw materials are weighed according to the stoichiometric ratio (or excessive $Ga_2O_3$) and mixed uniformly, then they are placed in an iridium crucible to be heated and melted by means of RF (Radio Frequency) induction heating, and finally, a gallium-containing garnet-structured scintillation ingot is grown from the melt by using a seed with a specific direction [J. Czochralski, J. Phys. Chem. 91, 219 (1918)]. Gallium-containing garnet-structured scintillators with diameters of 2 inches and 3 inches have been successfully grown by this method.

There is a major disadvantage in the grown of gallium-containing garnet-structured scintillators by the above method. That is, when the temperature exceeds 1300° C., the $Ga_2O_3$ component in the raw materials will be decomposed and volatilized ($Ga_2O_3 \leftrightarrow Ga_2O+O_2\uparrow$), resulting in component deviation, and $O_2$ in the decomposition products will also oxidize the iridium crucible. From the above chemical reaction formula, it can be seen that the decomposition reaction of $Ga_2O_3$ is reversible. If the partial pressure of $O_2$ in the system is increased, the decomposition reaction can be reversed, thus inhibiting the volatilization of $Ga_2O_3$. Nevertheless, too high $O_2$ partial pressure will aggravate the oxidation of the iridium crucible and increase the production cost sharply (because iridium is very expensive), so it is impossible to use a high $O_2$ partial pressure to inhibit the decomposition of $Ga_2O_3$. At present, gallium-containing garnet-structured scintillators are usually grown in an inert atmosphere or at a low $O_2$ partial pressure (0-3.0 vol. %), and excessive $Ga_2O_3$ (0-3.0 wt. % excess) is added for component compensation, so as to realize the balance between component volatilization and iridium oxidation [Kei Kamada, Yasuhiro Shoji, et al. IEEE Transactions on Nuclear Science, 63, 2(2016)]. However, growth of gallium-containing garnet-structured scintillators in low $O_2$ partial pressure or $O_2$-free atmosphere always causes great loss of Ga element, and the decomposition rate of $Ga_2O_3$ is difficult to control accurately, so it is impossible to calculate an accurate composition compensation ratio, which will seriously affect the uniformity of crystal performance, especially when the composition deviates from the congruent point greatly, it will be impossible to grow gallium-containing garnet-structured scintillators with high optical quality.

In order to reduce the volatilization loss of Ga element in the process of growing gallium-containing garnet-structured scintillators by Czochralski method, it is an effective method to replace the mixture of $Gd_2O_3$, $Ga_2O_3$, $Al_2O_3$, $CeO_2$ and oxide or carbonate powdery raw materials of other doping elements involved in the chemical formula with pre-synthesized polycrystalline raw materials. According to patent US20170153335A1, since the binding energy of Ga ions to any element in the melt obtained after melting gallium-containing garnet-structured scintillators is higher than that of Ga ions in $Ga_2O_3$ molecules, using polycrystalline materials to grow gallium-containing garnet-structure scintillators will greatly reduce the loss of Ga caused by $Ga_2O_3$ decomposition. Patent US20170153335A1 describes a method for synthesizing gallium-containing garnet-structured scintillator polycrystalline material, which includes the following steps: firstly, decomposing oxide raw materials such as $Gd_2O_3$, $Ga_2O_3$, $Al_2O_3$ and $CeO_2$ with a strong acid to prepare precursor, then synthesizing garnet phase complex by chemical reaction, and finally, getting gallium-containing garnet-structured scintillator polycrystalline materials by processes such as separation and sintering. This method has many disadvantages, such as many working procedures, complex process, need of strong acid, high cost, low efficiency and so on.

SUMMARY

In view of the above shortcomings in the prior art, an objective of the present disclosure is to provide a device and a method for synthesis of a gallium-containing garnet-structured scintillator polycrystalline material. The present disclosure can realize rapid, efficient and impurity-free synthesis of a gallium-containing garnet-structured scintillator polycrystalline material, and effectively inhibit volatilization of $Ga_2O_3$ components to ensure a stable Ga content in the gallium-containing garnet-structured scintillator polycrystalline material.

In order to achieve the above objective, the technical solution adopted by the present disclosure is as follows:

A device for synthesis of a gallium-containing garnet-structured scintillator polycrystalline material, the device including a polycrystalline material synthesis chamber made of a thermal insulation material, with an openable cover plate arranged on the polycrystalline material synthesis chamber for picking and placing of raw materials; a crucible arranged at the center of the bottom of the polycrystalline material synthesis chamber; an induction coil annularly arranged outside the polycrystalline material synthesis chamber at a position with a height corresponding to that of the crucible, wherein an arc heating device is arranged on a central axis of the induction coil in the polycrystalline material synthesis chamber, and the arc heating device is connected to a power supply so as to heat and melt raw materials at the center of the crucible by means of the high temperature generated by arc discharge; the induction coil is connected to an induction power supply so as to heat the raw materials in the crucible from the center outwards by using the increased electric conductivity of the melt melted by the arc heating device under the electromagnetic field of RF.

The induction coil has a hollow cross section, and a cooling water pipe is arranged at the bottom of the crucible;

the cooling water pipe and the induction coil are supplied with cooling water for cooling the bottom and periphery of the crucible to prevent the crucible from being melted.

The thermal insulation material is $ZrO_2$ ceramic or $Al_2O_3$ ceramic, or a combination thereof.

The crucible is made of quartz or corundum ceramic and fixed in the polycrystalline material synthesis chamber.

A positive pole of the arc heating device is located right above/right below the crucible, a negative pole of the arc heating device is located right below/right above the crucible, and the positive pole of the arc heating device is configured opposite to the negative pole of the arc heating device.

A method for synthesis of a gallium-containing garnet-structured scintillator polycrystalline material, wherein raw materials for synthesis prepared in advance are uniformly mixed and put into a crucible, and then an arc heating device is started to heat the raw materials at the center of the crucible by using the high temperature generated by arc discharge, so that the raw materials at the center are melted first, and become conductive; then, a power supply connected to an induction coil is started to generate an alternating induction electromagnetic field, so that the raw materials in the crucible are continuously heated up by eddy current under the electromagnetic field of RF, gradually melt from the center outwards until the required melting boundary is reached, then held at the temperature for a certain period of time to ensure that the raw materials fully react and transit to be garnet phase, and finally cool down to room temperature, thereby obtaining a synthesized polycrystalline material in the crucible; the power supply of the arc heating device is turned off after the raw materials at the center are melted, and become conductive.

The synthesis method adopts the above device for synthesis of a gallium-containing garnet-structured scintillator polycrystalline material, and comprises the following specific steps, 1) weighing each of powdery raw materials according to the stoichiometric ratio specified by the chemical molecular formula of the gallium-containing garnet-structured scintillator polycrystalline material to be synthesized, and uniformly mixing the weighed powdery raw materials to obtain a raw material mixture, wherein each of the powdery raw materials has a purity of ≥99.99%;

2) placing the raw material mixture from the step 1) in the crucible;

3) starting the power supply connected to the induction coil to generate an alternating induction electromagnetic field;

4) starting the arc heating device to heat the raw materials at the center of the crucible by the high temperature generated by arc discharge to melt the raw materials at the center first, and it becomes conductive, thus meeting the requirements on the electric conductivity of the melted raw materials for heating by the induction coil;

5) gradually increasing an output power of the induction coil, so that the raw materials in the crucible can be continuously heated up by eddy current under electromagnetic field of RF; the power supply of the arc heating device is turned off after the raw materials at the center are melted, and become conductive;

6) further increasing the output power of the induction coil to gradually melt the raw materials from the center outwards until the required melting boundary is reached, and then keeping a constant temperature for 0.5-4 h to ensure that the raw materials fully react and transit to be the garnet phase;

7) cooling down to room temperature at a certain rate, thereby obtaining the synthesized polycrystalline material in the crucible.

The required melting boundary between the melt and the crucible in the step 6) is determined according to the following requirements: controlling the heating power of the induction coil to prevent direct contact between the crucible and the melt, and ensuring that a layer of powdery raw materials is left between the crucible and the melt to isolate the crucible from the melt, so that the polycrystalline material is not polluted by the crucible.

The above steps 1) to 7) are operated under an atmosphere of air or a mixed gas atmosphere formed by mixing $O_2$ with any one, two or three of $N_2$, Ar or $CO_2$, wherein the content of $O_2$ is higher than 3.0 vol. %, so as to inhibit the decomposition of $Ga_2O_3$.

The time required for reducing the power of the induction coil from the maximum value to zero in the step 7) is 0.1-200 h.

Compared with the prior art, the present disclosure has the following beneficial effects:

1. The synthesis device can heat the oxide or carbonate raw materials to above the melt point temperature, and make them fully react to synthesize garnet phase polycrystalline materials.

2. In this synthesis process, because the synthesis is carried out in an oxygen-rich atmosphere, the volatilization of $Ga_2O_3$ component can be effectively inhibited, and thus gallium-containing garnet-structured scintillator polycrystalline materials with stable composition can be obtained.

3. In this synthesis process, the raw materials are melted from the center outwards due to their self-heating, and a layer of powdery raw materials is left between the crucible and the melt in the melting process to isolate the crucible from the melt, so that the polycrystalline materials are not polluted by the crucible, and no impurities are introduced in the whole synthesis process.

4. The device selects low-cost corundum ceramics or quartz as crucible material, which avoids the expensive iridium crucible, it does not need to worry about crucible oxidation, and the synthesis can be carried out in an oxygen-enriched atmosphere.

5. The gallium-containing garnet-structured scintillator polycrystalline material synthesized by the present disclosure can be used as a raw material for growing gallium-containing garnet-structured scintillating single crystals by Czochralski method, thereby avoiding the decomposition of $Ga_2O_3$, weakening the reduction of Ga component and the oxidation loss of iridium, and being beneficial to the growth of gallium-containing garnet-structured scintillators with uniform composition.

BRIEF DESCRIPTION OF THE DRAWINGS

FIG. 1—schematic diagram of the device for synthesis of a gallium-containing garnet-structured scintillator polycrystalline material of the present disclosure.

Among them, 1—thermal insulation material; 2—induction coil; 3—crucible; 4—positive pole of arc heating device; 5—negative pole of arc heating device; 6—cooling water pipe; 7—polycrystalline material synthesis chamber.

DETAILED DESCRIPTION OF THE EMBODIMENTS

The following is a further detailed description of the present disclosure with reference to the drawings and specific embodiments.

With reference to FIG. 1, it can be seen that device for synthesis of a gallium-containing garnet-structured scintillator polycrystalline material of the present disclosure comprises a polycrystalline material synthesis chamber 7 made of a thermal insulation material 1, and an openable cover plate is arranged on the polycrystalline material synthesis chamber 7 for picking and placing raw materials; the thermal insulation material 1 is $ZrO_2$ ceramic or $Al_2O_3$ ceramic, or a combination thereof. A crucible 3 is arranged in the center of the bottom of the polycrystalline material synthesis chamber 7, and the crucible 3 is made of quartz or corundum ($Al_2O_3$) ceramic and fixed in the polycrystalline material synthesis chamber 7. A (Radio Frequency) induction coil 2 is annularly arranged outside the polycrystalline material synthesis chamber 7 at a position with a height corresponding to that of the crucible 3. An arc heating device is arranged on a central axis of the induction coil 2 in the polycrystalline material synthesis chamber 7, and is connected to a power supply to heat and melt raw materials in the center of the crucible by using the high temperature generated by arc discharge. A positive pole 4 of the arc heating device is located right above the crucible 3, a negative pole 5 of the arc heating device is located right below the crucible 3, and the positive pole 4 of the arc heating device is configured opposite to the negative pole 5 of the arc heating device. The induction coil 2 is connected to an induction power supply (Radio Frequency) to heat the raw materials in the crucible from the center outwards by using the increased electric conductivity of the melt melted by the arc heating device under the electromagnetic field of RF.

The cross section of the induction coil 2 is hollow, a cooling water pipe 6 is arranged at the bottom of the crucible 3, and the cooling water pipe 6 and the induction coil 2 are supplied with cooling water for cooling the bottom and periphery of the crucible to prevent the crucible from being melted, thereby preventing the melted materials from contacting with crucible and being polluted. The induction coil of the present disclosure is a pipe structure with a central hole, cooling water is passed through the central hole, and the cooling water is deionized water. Deionized water has great resistance, so it can be considered as an insulating material. According to the present disclosure, cooling water is introduced into the induction coil in order to prevent the induction coil and crucible from melting.

Also, the present disclosure provides a method for synthesis of a gallium-containing garnet-structured scintillator polycrystalline material, wherein raw materials for synthesis prepared in advance are uniformly mixed and put into a crucible, and then an arc heating device is started to heat the raw materials at the center of the crucible by using the high temperature generated by arc discharge, so that the raw materials at the center are melted first, and become conductive; then, a power supply connected to an induction coil is started to generate an alternating induction electromagnetic field, so that the raw materials in the crucible are continuously heated up by eddy current under the electromagnetic field of RF, gradually melt from the center outwards until the required melting boundary is reached, then held at the temperature for a certain period of time to ensure that the raw materials fully react and transit to be garnet phase, and finally cool down to room temperature, thereby obtaining a synthesized polycrystalline material in the crucible; the power supply of the arc heating device is turned off after the raw materials at the center are melted, and become conductive.

The synthesis method uses the above device for synthesis of a gallium-containing garnet-structured scintillator polycrystalline material, and includes the following specific steps, 1) weighing each of powdery raw materials according to the stoichiometric ratio specified by the chemical molecular formula of the gallium-containing garnet-structured scintillator polycrystalline material to be synthesized, and uniformly mixing the weighed powdery raw materials to obtain a raw material mixture, wherein each of the powdery raw materials has a purity of ≥99.99%; the molecular formula of the gallium-containing garnet-structured scintillator polycrystalline material to be synthesized is $(Gd_{1-x-i-j}A_xB_iC_j)_3(Ga_yAl_{1-y})_5O_{12}$, wherein A is one of Y, Lu and La; B is one of Ce and Pr; C is one of Mg, Ca, Sr, Ba and Zn, and wherein $0 \le x \le 1$, $0.00001 < i < 0.05$, $0.00001 < j < 0.05$, $0.4 < y < 1$, and $x+i+j \le 1$;

2) placing the raw material mixture from the step 1) in the crucible;

3) starting the power supply connected to the induction coil to generate an alternating induction electromagnetic field;

4) starting the arc heating device to heat the raw materials at the center of the crucible by the high temperature generated by arc discharge to melt the raw materials at the center first, and become conductive, thus meeting the requirements on the electric conductivity of the raw materials for heating by the induction coil; there is no requirement on the starting sequence of the induction coil power supply and the arc heating device power supply; the arc heating device can be started to melt the raw materials at the center before turning on the induction coil, or the induction coil can be turned on first before turning on the arc heating device, or the arc heating device and the induction coil can be started at the same time;

5) gradually increasing the output power of the induction coil, so that the raw materials in the crucible can be continuously heated up by eddy current under the electromagnetic field of RF; the power supply of the arc heating device is turned off after the raw materials at the center are melted, and become conductive;

6) further increasing the output power of the induction coil to gradually melt the raw materials from the center outwards until the required melting boundary is reached, and then keeping a constant temperature for 0.5-4 h to ensure that the raw materials fully react and transit to be the garnet phase;

7) cooling down to room temperature at a certain rate, thereby obtaining the synthesized polycrystalline material in the crucible.

Preferably, the required melting boundary between the melt and the crucible in the step 6) is determined according to the following requirements: controlling the heating power of the induction coil to prevent direct contact between the crucible and the melt, and ensuring that a layer of powdery raw materials is left between the crucible and the melt to isolate the crucible from the melt, so that the polycrystalline material is not polluted by the crucible.

The above steps 1) to 7) are operated under an atmosphere of air or a mixed gas atmosphere formed by mixing $O_2$ with any one, two or three of $N_2$, Ar or $CO_2$, wherein the content of $O_2$ is higher than 3.0 vol. %, so as to inhibit the decomposition of $Ga_2O_3$.

The time required for reducing the power of the induction coil from the maximum value to zero in the step 7) is 0.1-200 h, preferably 20-50 h.

Several synthesis examples are given below to further help understand the present disclosure.

Example 1

A corundum crucible with a size of Φ200 mm×150 mm was used, the inner diameter of the copper induction coil was 250 mm, the thermal insulation material was $ZrO_2$ ceramic with a thickness of 30 mm, and a copper cooling water pipe was arranged at the bottom of the crucible. 5822.11 g $Gd_2O_3$, 1100.54 g $Al_2O_3$, 3034.83 g $Ga_2O_3$ and 40.59 g $CeO_2$ powdery raw materials were weighed respectively, and then mixed uniformly. The mixed powdery raw materials were put into the corundum crucible and compacted. The induction coil power supply and arc heating power supply were started in turn. When the center of raw materials started to melt, the arc heating device was turned off and the heating power of the induction coil was increased at a rate of 3 kW/h, so that the raw materials gradually melted outwards from the center until the melting zone was close to the crucible wall. As the side wall and bottom of the crucible were both supplied with cooling water, it can be ensured that the crucible is not melted. After keeping a constant temperature (constant power) for 3 h, the peak power of the induction coil was reduced to zero in 40 h. The whole process was carried out in an air atmosphere. A yellow polycrystalline material was obtained after opening the crucible. XRD phase test showed that the polycrystalline material was garnet phase and there was no other impurity phase.

Example 2

A corundum crucible with a size of Φ200 mm×150 mm was used, the inner diameter of the copper induction coil was 250 mm, the thermal insulation material was $ZrO_2$ ceramic with a thickness of 30 mm, and a copper cooling water pipe was arranged at the bottom of the crucible. 5892.58 g $Gd_2O_3$, 1288.51 g $Al_2O_3$, 2770.12 g $Ga_2O_3$ and 50.52 g $CeO_2$ powdery raw materials were weighed respectively, and then mixed uniformly. The mixed powdery raw materials were put into the corundum crucible and compacted. The induction coil power supply and arc heating power supply were started in turn. When the center of raw materials started to melt, the arc heating device was turned off and the heating power of the induction coil was increased at a rate of 3 kW/h, so that the raw materials gradually melted outwards from the center until the melting zone was close to the crucible wall. As the side wall and bottom of the crucible were both supplied with cooling water, it can be ensured that the crucible is not melted. After keeping a constant temperature (constant power) for 2 h, the peak power of the induction coil was reduced to zero in 30 h. The whole process was carried out in an air atmosphere. A yellow polycrystalline material was obtained after opening the crucible. XRD phase test showed that the polycrystalline material was garnet phase and there was no other impurity phase.

Example 3

A quartz crucible with a size of Φ200 mm×150 mm was used, the inner diameter of the copper induction coil was 250 mm, the thermal insulation material was $Al_2O_3$ ceramic with a thickness of 30 mm, and a copper cooling water pipe was arranged at the bottom of the crucible. 5892.58 g $Gd_2O_3$, 1288.51 g $Al_2O_3$, 2770.12 g $Ga_2O_3$, 50.52 g $CeO_2$ and 5 g $MgCO_3$ powdery raw materials were weighed respectively, and then mixed uniformly. The mixed powdery raw materials were put into the corundum crucible and compacted. The induction coil power supply and arc heating power supply were started in turn. When the center of raw materials started to melt, the arc heating device was turned off and the heating power of the induction coil was increased at a rate of 3 kW/h, so that the raw materials gradually melted outwards from the center until the melting zone was close to the crucible wall. As the side wall and bottom of the crucible were both supplied with cooling water, it can be ensured that the crucible is not melted. After keeping a constant temperature (constant power) for 3.5 h, the peak power of the induction coil was reduced to zero in 45 h. The whole process was carried out in an air atmosphere. A yellow polycrystalline material was obtained after opening the crucible. XRD phase test showed that the polycrystalline material was garnet phase and there was no other impurity phase.

Example 4

A corundum crucible with a size of Φ200 mm×150 mm was used, the inner diameter of the copper induction coil was 250 mm, the thermal insulation material was $Al_2O_3$ ceramic with a thickness of 30 mm, and a copper cooling water pipe was arranged at the bottom of the crucible. 5892.58 g $Gd_2O_3$, 1288.51 g $Al_2O_3$, 2770.12 g $Ga_2O_3$, 50.52 g $CeO_2$ and 7 g $CaCO_3$ powdery raw materials were weighed respectively, and then mixed uniformly. The mixed powdery raw materials were put into the corundum crucible and compacted. The induction coil power supply and arc heating power supply were started in turn. When the center of raw materials started to melt, the arc heating device was turned off and the heating power of the induction coil was increased at a rate of 3 kW/h, so that the raw materials gradually melted outwards from the center until the melting zone was close to the crucible wall. As the side wall and bottom of the crucible were both supplied with cooling water, it can be ensured that the crucible is not melted. After keeping a constant temperature (constant power) for 2 h, the peak power of the induction coil was reduced to zero in 50 h. The whole process was carried out in an air atmosphere. A yellow polycrystalline material was obtained after opening the crucible. XRD phase test showed that the polycrystalline material was garnet phase and there was no other impurity phase.

Example 5

A quartz crucible with a size of Φ200 mm×150 mm was used, the inner diameter of the copper induction coil was 250 mm, the thermal insulation material was $ZrO_2$ ceramic with a thickness of 30 mm, and a copper cooling water pipe was arranged at the bottom of the crucible. 5892.58 g $Gd_2O_3$, 1288.51 g $Al_2O_3$, 2770.12 g $Ga_2O_3$, 50.52 g $CeO_2$ and 8 g $BaCO_3$ powdery raw materials were weighed respectively, and then mixed uniformly. The mixed powdery raw materials were put into the corundum crucible and compacted. The induction coil power supply and arc heating power supply were started in turn. When the center of raw materials started to melt, the arc heating device was turned off and the heating power of the induction coil was increased at a rate of 3 kW/h, so that the raw materials gradually melted outwards from the center until the melting zone was close to the crucible wall. As the side wall and bottom of the crucible were both supplied with cooling water, it can be ensured that the crucible is not melted. After keeping a constant temperature (constant power) for 1.5 h, the peak power of the induction coil was reduced to zero in 25 h. The whole process was carried out in an air atmosphere. A yellow polycrystalline material was obtained after opening the crucible. XRD phase test showed that the polycrystalline material was garnet phase and there was no other impurity phase.

The above-mentioned embodiments of the present disclosure are only examples to illustrate the present disclosure, and are not intended to limit the implementation of the present disclosure. For those of ordinary skill in the field, other changes and variations in different forms can be made on the basis of the above description. All embodiments cannot be exhaustive here. All obvious changes or variations derived from the technical solution of the present disclosure are still within the scope of protection of the present disclosure.

What is claimed is:

1. A method for synthesis of a gallium-containing garnet-structured scintillator polycrystalline material, wherein raw materials for synthesis prepared in advance are uniformly mixed and put into a crucible, and then an arc heating device is started to heat the raw materials at the center of the crucible by using the heat generated by arc discharge, so that the raw materials at the center are melted first, and become conductive; then, a power supply connected to an induction coil is started to generate an alternating induction electromagnetic field, so that the raw materials in the crucible are continuously heated up by eddy current under the electromagnetic field of RF, gradually melt from the center outwards until a required melting boundary is reached, then held at the temperature for a certain period of time to ensure that the raw materials fully react and transited to be garnet phase, and finally cool down to room temperature, thereby obtaining a synthesized polycrystalline material in the crucible; the power supply of the arc heating device is turned off after the raw materials at the center are melted, and become conductive.

2. The method for synthesis of a gallium-containing garnet-structured scintillator polycrystalline material according to claim 1, wherein the method is carried out by using a device for synthesis of a gallium-containing garnet-structured scintillator polycrystalline material, and the device for synthesis of a gallium-containing garnet-structured scintillator polycrystalline material comprising a polycrystalline material synthesis chamber made of a thermal insulation material, with an openable cover plate arranged on the polycrystalline material synthesis chamber for picking and placing of raw materials; a crucible arranged at the center of the bottom of the polycrystalline material synthesis chamber; an induction coil annularly arranged outside the polycrystalline material synthesis chamber at a position with a height corresponding to that of the crucible, wherein an arc heating device is arranged on a central axis of the induction coil in the polycrystalline material synthesis chamber, and the arc heating device is connected to a power supply so as to heat and melt raw materials at the center of the crucible by means of the heat generated by arc discharge; the induction coil is connected to an induction power supply so as to heat the raw materials in the crucible from the center outwards by using the increased electric conductivity of the melt melted by the arc heating device under the electromagnetic field of RF;

and the method comprises the following specific steps, 1) weighing each of powdery raw materials according to the stoichiometric ratio specified by the chemical molecular formula of the gallium-containing garnet-structured scintillator polycrystalline material to be synthesized, and uniformly mixing the weighed powdery raw materials to obtain a raw material mixture, wherein each of the powdery raw materials has a purity of ≥99.99%;

2) placing the raw material mixture from the step 1) in the crucible;

3) starting the arc heating device to heat the raw materials at the center of the crucible by the heat generated by arc discharge to melt the raw materials at the center first, and the electric conductivity of the melted raw materials in the center increases after melting of the raw materials, thus meeting the requirements on the electric conductivity of the raw materials for heating by the induction coil;

4) starting the power supply connected to the induction coil to generate an alternating induction electromagnetic field;

5) gradually increasing the output power of the induction coil, so that the raw materials in the crucible can be continuously heated up by eddy current under the electromagnetic field of RF; the power supply of the arc heating device is turned off after the raw materials at the center are melted, and become conductive;

6) Further increasing the output power of the induction coil to gradually melt the raw materials from the center outwards until the required melting boundary is reached, and then keeping a constant temperature for 0.5-4 h to ensure that the raw materials fully react and transited to be the garnet phase;

7) Cooling down to room temperature at a certain rate, thereby obtaining the synthesized polycrystalline material in the crucible.

3. The method for synthesis of a gallium-containing garnet-structured scintillator polycrystalline material according to claim 2, wherein the required melting boundary between the melt and the crucible in the step 6) is determined according to the following requirements: controlling the heating power of the induction coil to prevent direct contact between the crucible and the melt, and ensuring that a layer of powdery raw materials is left between the crucible and the melt to isolate the crucible from the melt, so that the polycrystalline material is not polluted by the crucible.

4. The method for synthesis of a gallium-containing garnet-structured scintillator polycrystalline material according to claim 2, wherein the above steps 1) to 7) are operated under an atmosphere of air or a mixed gas atmosphere formed by mixing $O_2$ with any one, two or three of $N_2$, Ar or $CO_2$, wherein the content of $O_2$ is higher than 3.0 vol. %, so as to inhibit the decomposition of $Ga_2O_3$.

5. The method for synthesis of a gallium-containing garnet-structured scintillator polycrystalline material according to claim 2, wherein the time required for reducing the power of the induction coil from the maximum value to zero in the step 7) is 0.1-200 h.

6. The method for synthesis of a gallium-containing garnet-structured scintillator polycrystalline material according to claim 2, wherein the induction coil has a hollow cross section, and a cooling water pipe is arranged at the bottom of the crucible; the cooling water pipe and the induction coil are supplied with cooling water for cooling the bottom and periphery of the crucible to prevent the crucible from being melted.

7. The method for synthesis of a gallium-containing garnet-structured scintillator polycrystalline material according to claim 2, wherein the thermal insulation material is $ZrO_2$ ceramic or $Al_2O_3$ ceramic, or a combination thereof.

8. The method for synthesis of a gallium-containing garnet-structured scintillator polycrystalline material according to claim 2, wherein the crucible is made of quartz or corundum ceramic and fixed in the polycrystalline material synthesis chamber.

9. The method for synthesis of a gallium-containing garnet-structured scintillator polycrystalline material according to claim 2, wherein a positive pole of the arc heating device is located right above or right below the crucible, a negative pole of the arc heating device is located right below or right above the crucible, and the positive pole of the arc heating device is configured opposite to the negative pole of the arc heating device.

\* \* \* \* \*